_United States Patent_ [19]

Friehauf et al.

[11] Patent Number: 4,707,753
[45] Date of Patent: Nov. 17, 1987

[54] DISK DRIVE HEAD ACCESS MECHANISM

[75] Inventors: William J. Friehauf, Thornton; Donovan M. Janssen; Alan J. Kirton, both of Boulder; Michael E. Nard, Longmont; Leroy Rose, Boulder, all of Colo.

[73] Assignee: International Business Machines Corporation, Armonk, N.Y.

[21] Appl. No.: 807,044

[22] Filed: Dec. 9, 1985

[51] Int. Cl.$^4$ .............................................. G11B 5/55
[52] U.S. Cl. ...................................... 360/106; 360/97
[58] Field of Search ............... 360/106, 107, 109, 105, 360/97-99; 192/149

[56] References Cited

U.S. PATENT DOCUMENTS

| Re. 29,081 | 12/1986 | Grundmann | 335/228 |
| 2,947,185 | 8/1960 | Ziegler | 74/95 |
| 3,488,098 | 1/1970 | Sobczak | 78/89.2 |
| 4,030,137 | 6/1977 | Dalziel | 360/106 |
| 4,161,004 | 7/1979 | Dalziel | 360/106 |
| 4,170,146 | 10/1979 | Owens | 74/89.2 |
| 4,399,447 | 8/1983 | Bryer | 360/106 |
| 4,456,937 | 6/1984 | Iftikar et al. | 360/106 |
| 4,599,666 | 7/1986 | Liu et al. | 360/106 |

OTHER PUBLICATIONS

Eide et al, IBM TDB, vol. 26, No. 5, 10/83, pp. 2301-2302.
U.S. Ser. No. 628,044, filed 7/5/84, "Flexible Disk Drive Optimized for Automated Manufacture".
U.S. Ser. No. 627,651, filed 7/3/84, "Torsional Actuator for Loading and Unloading Flexible Disk Drive".
U.S. Ser. No. 628,633, filed 7/6/84, "Two Stage Colleting in a Flexible Disk Drive".

_Primary Examiner_—John H. Wolff
_Attorney, Agent, or Firm_—Manny W. Schecter; Francis A. Sirr; Maurice H. Klitzman

[57] ABSTRACT

A flexible disk drive head access mechanism optimized for automated manufacture is disclosed. The mechanism is a complete subassembly. As such, the mechanism can be handled by a robot, as the mechanism is automatically mounted to the disk drive's main frame member. The mechanism comprises a stepping motor having a metal output pulley which is wrapped by a metal band. The middle of the band is welded to the motor's output pulley. The two free ends of the band are welded to a flexible, low-mass band tensioner. This tensioner is a thin, elongated member which includes a U-shaped portion which is operable to tension the band about the pulley. Attachment of the ends of the band to the tensioner not only tensions the band, but also operates to bend the tensioner slightly toward the pulley, thus causing the band to self-center itself in a 360° wrap about the pulley. In this way, rotary to linear output from the mechanism is assured. The low mass of the tensioner insures that the band is not damaged as the motor is handled by the robot, leaving the band and its tensioner unsupported and free to move. A damping arm is welded to the tensioner and operates to damp vibration of the tensioner when the mechanism is at the far end of its head access stroke. In this way, read/write errors are minimized.

14 Claims, 5 Drawing Figures

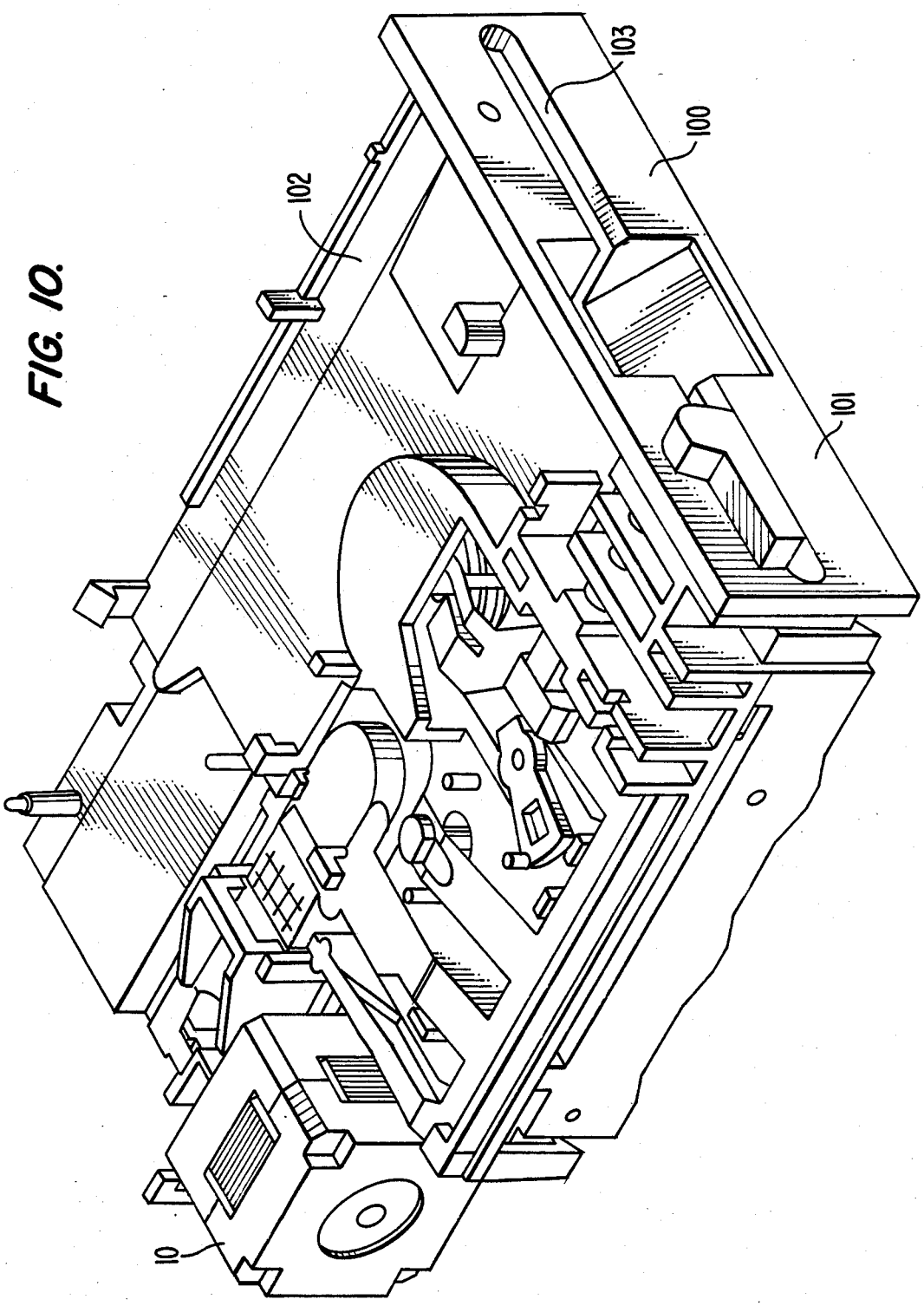

DISK DRIVE HEAD ACCESS MECHANISM

BACKGROUND OF THE INVENTION

1. Field of the Invention

This invention relates to a mechanism for converting alternating rotary motion to reciprocating motion, and more specifically to a mechanism comprising a yieldable transmission member engaged with the periphery of a pulley.

2. Background Art

Mechanisms for transforming rotary motion to linear motion are known in the art. One such mechanism comprises a flexible band engaged by a pulley wherein the pulley is rotated by a motor. The flexible band has an elongated slot throughout the length of one end of the band. The other end of the band is designed such that it can be inserted through the elongated slot as the mid portion of the band is wrapped around the pulley. A flexible band of this type is commonly referred to as a split band. The two ends of the band extend out from the pulley in opposite directions and are attached to opposite ends of an elongated member. As the pulley rotates, one end of the band is wrapped up by the pulley while the other end unwraps effectuating a corresponding translational motion to the elongated member.

This type of mechanism is useful in a disk drive system for imparting linear movement to a magnetic head carriage that is mounted on a member that is driven by the motion of the flexible band. A magnetic head carriage typically comprises a stationary lower recording arm and a pivotally mounted upper recording head. Thus, the position of a recording head may be changed linearly along the radius of a disk to access a desired track.

Flexible, or floppy disk drives are well known in the data processing industry, and are presently widely utilized as a primary peripheral input/output device for personal or home computers. These disk drives typically use a flexible five and one-fourth inch disk contained within a flexible cartridge or envelope. Such drives are typically of the well-known "full height" or "half-height" variety. With the advent of the high use of these computers in home and business, these disk drives have a correspondingly high usage rate.

These disk drives that have utilized head carriage and head access mechanisms for transforming rotary motion to linear motion, as described above, have had problems associated with them. One such problem is that the mechanisms were assembled either inside, or outside the disk drive assembly using a variety of small, hard to manipulate parts. As a result, it was difficult, time consuming, and costly to assemble the disk drives. In addition, those mechanisms that were assembled outside of the drive assembly were attached to rigid massive yokes that made damage to the band likely if this structure were handled improperly during assembly.

Poor reliability and inaccurate operation is another problem with the previously stated mechanism where the ends of the flexible band were connected to a rigid massive yoke. Since the pulley and motor are typically mounted to the disk drive frame, and the yoke is attached to the head carriage assembly, inherent manufacturing tolerances may cause the yoke to be too close or too far away from the pulley. If the yoke is not accurately positioned relative to the pulley, i.e. the yoke is too close or too far from the pulley, the ends of the band will assume a V-shape as they leave engagement with the pulley, and the output motion will be arcuate, not linear. As a result, after the head carriage assembly is attached to the yoke, and during actual operation, this arcuate motion could produce improper head movement relative to the disk, causing inaccurate operation and poor reliability.

Another problem which has heretofore been recognized, and which affects the reliability and accuracy of head access mechanisms, involves vibrations of this mechanism which can cause head transducing errors. It has been necessary to damp these unwanted vibrations for reliable and accurate operation of the mechanism. However, damping mechanisms that have previously been used have made the assembly of disk drives even more difficult, time consuming and costly by the associated added hardware.

In this document, the term carriage, head carriage, or head carriage assembly will be used to mean a structure which comprises a stationary lower recording arm and a pivotally mounted upper recording head. The term head access mechanism shall be used to mean an assembly of parts comprising a motor, pulley, band, and tensioner which work together to transform the motor's rotary motion to linear motion of the tensioner.

SUMMARY OF THE INVENTION

It is, therefore, an object of this invention to reduce the difficulty, time, and cost of assembling a head access mechanism into a disk drive.

It is a further object of this invention not to damage any part of the head access mechanism during this assembly.

It is a further object of this invention to reduce the effects of manufacturing tolerances on the reliability and accurate operation of the head access operation.

It is a further object of this invention to damp vibrations in the head access mechanism while maintaining the reduction in the difficulty, time, and cost of assembling the head access mechanism.

In furtherance of the objects of this invention, and to overcome the problems discussed in the background art, a disk drive head access mechanism is disclosed that can be assembled in its entirety outside of a disk drive by an automated process. This head access mechanism can be handled without damage by automated manufacturing techniques during the mounting and assembling of the assembled head access mechanism into a disk drive. This head access mechanism is adaptable for robotic automation, effectuates a minimum number of assembly operations, and reduces the time and cost of production.

A flexible disk drive head access mechanism having a minimum number of parts and optimized for automated manufacture is disclosed. The access mechanism of this invention is assembled by an automated process and is self-supporting as a unitary assembly to facilitate robotic handling while being mounted to a disk drive frame. During operation, the access mechanism of this invention effectuates linear movement of a magnetic head carriage along a radial line of a magnetic memory disk.

The mechanism comprises a rotary output motor, a pulley, a flexible band, and a low mass flexible tensioner. The cylindrical pulley is mounted to the shaft of the motor. The mid portion of the flexible band is secured to the pulley as the outer portions of the flexible band wrap around the pulley in opposite directions, leave contact with the surface of the pulley where the two portions cross, and are attached to opposing ends or the low mass flexible tensioner. The low mass flexible tensioner comprises a U-shaped portion which compresses slightly to tension and center the flexible band about the pulley.

The low mass of the flexible tensioner makes the assembly capable of robotic handling. As the assembly is lifted, the tensioner is light enough in weight such that under the force of gravity the tensioner will not pull on the flexible band with enough force to distort, misalign, or break the flexible band, or cause the flexible band to move off center of the pulley. Therefore, the access mechanism can be grasped on the ends of the motor housing leaving the tensioner hanging in space subject to the forces of gravity without additional support, and without causing damage or misalignment to the flexible band. Because the low mass tensioner needs no other support means to prevent it from pulling on the flexible band with a force great enough to damage the flexible band, the disk drive head access mechanism is thus a self-supporting unitary assembly capable of robotic handling without damage.

In addition, reliable and accurate operation of the access mechanism must be insured while utilizing this low mass tensioner for ease of further assembly by robotic handling. Reliability and accuracy is insured with the low mass tensioner by the flexibility and shape of the tensioner. The flexibility, or compliance, of the tensioner is in a direction that is perpendicular to the axis of the pulley. This flexible tensioner will minimize the forces transmitted back through the head carriage when there is a positional mismatch between the stepper motor, attached to the frame, and the tensioner, attached to the head carriage. It is this flexibility and shape that insures that the flexible band will always be self-centering and properly tensioned about the motor's pulley. Without this, the output motion of the access mechanism would be arcuate and not linear. As a result, after the head carriage assembly is attached to the tensioner, and during actual operation, this arcuate motion could produce improper recording head movement relative to the disk.

The tensioner has mounting means to have a head carriage assembly at one end. As the stepper motor indexes rotationally, linear movement is imparted to the tensioner which causes the head carriage assembly to traverse a recording disk along its radius. As the mechanism is accessing the outer most tracks on a disk, the tensioner becomes cantilevered a maximum amount. Under this extreme cantilevered position the head carriage assembly and tensioner are vulnerable to vibrations that may cause head transducing errors. To prevent excessive tensioner vibrations, a damping member is attached to the tensioner in a manner which does not reduce the flexibility of the tensioner, but yet damps the vibration of the tensioner and the band. In furtherance of the objectives of this invention, this damping member further increases the reliability and accuracy during operation of a head access mechanism which utilizes a low mass tensioner to effectuate assembly by robotic handling.

BRIEF DESCRIPTION OF THE DRAWING

FIG. 10 shows a disk drive with a head access mechanism.

DESCRIPTION OF PREFERRED EMBODIMENT

Figure 1:
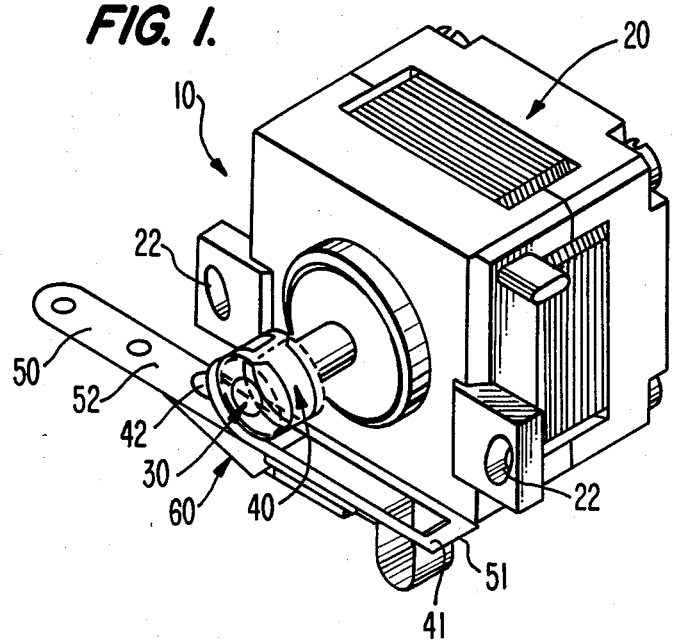
FIG. 1 shows an isometric view of the disk drive access mechanism with the damping member.
Figure 4:
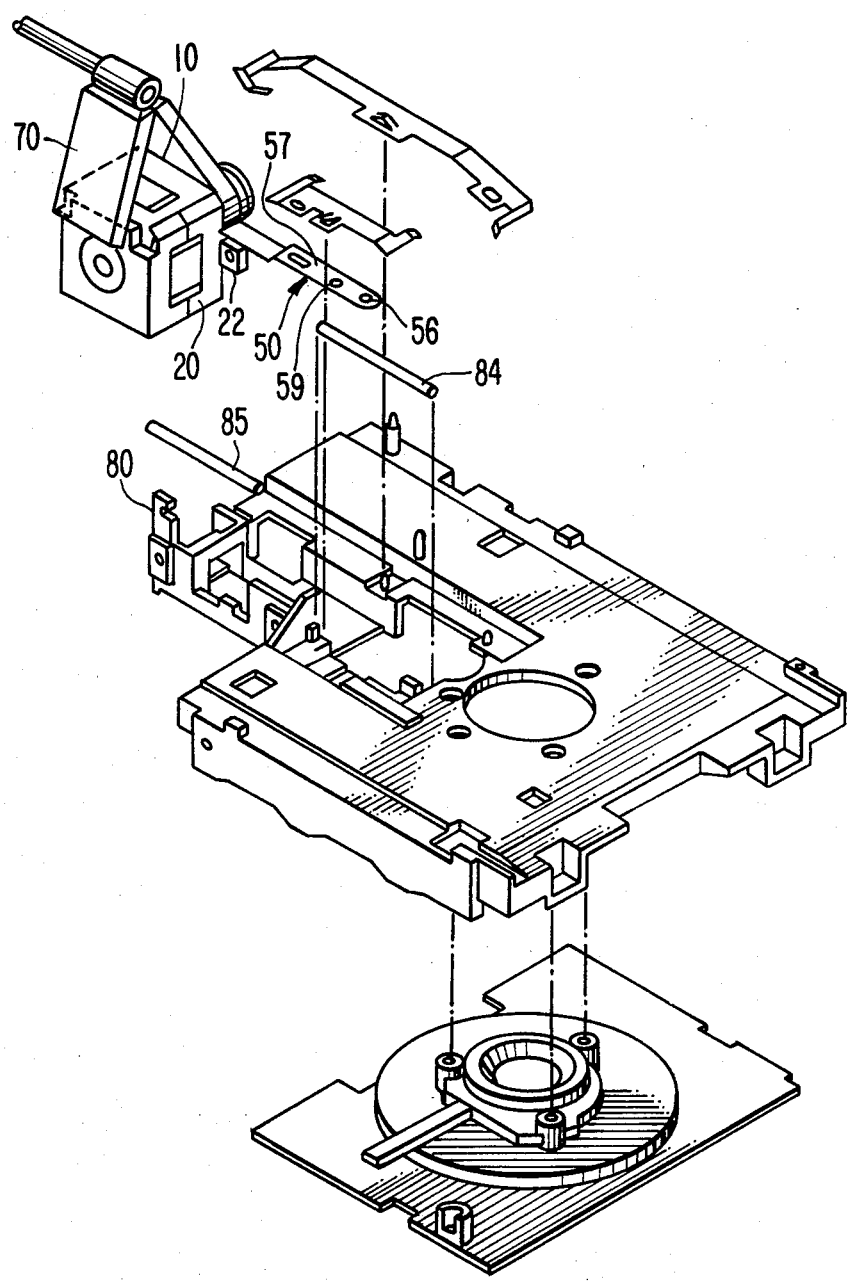
FIG. 4 is an exploded perspective view of the lower frame of a disk drive showing a robot grasping the head access mechanism for assembly onto the frame.

The disk drive access mechanism 10 is shown in FIG. 4 as an assembled unit capable of being handled by a robotic hand 70 as the mechanism is mounted to a disk drive's main frame member 80. As shown in FIG. 1, the mechanism comprises a stepper motor 20, a pulley 30 attached to the shaft of the stepper motor 20, a flexible band 40 wrapped around the pulley 30, a tensioner 50, and a damping member 60. To better illustrate the flexible band, the pulley 30 is shown in dotted lines. The mid portion 45 of the flexible band 40 is secured to the pulley 30 preferably by welding. The two ends 41 and 42 of the band 40 are attached to the tensioner 50 at ends 51 and 52, respectively, preferably by welding.

Figure 2:
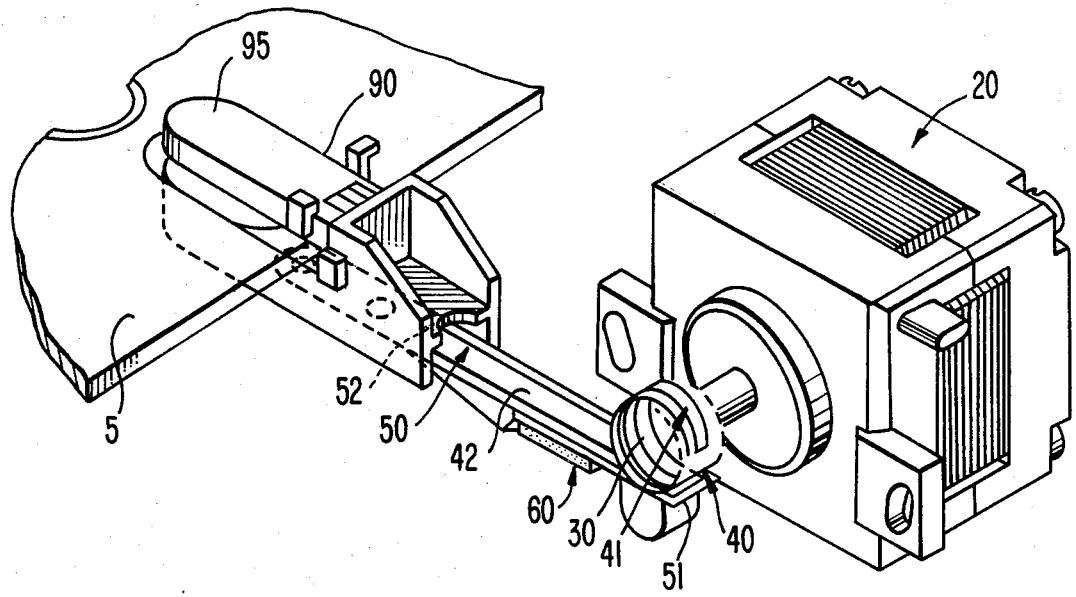
FIG. 2 shows an isometric view of the disk drive access mechanism with the damping member and with the head carriage in its inner most position as it would be after the mechanism was assembled into a disk drive and during operation.
Figure 3:
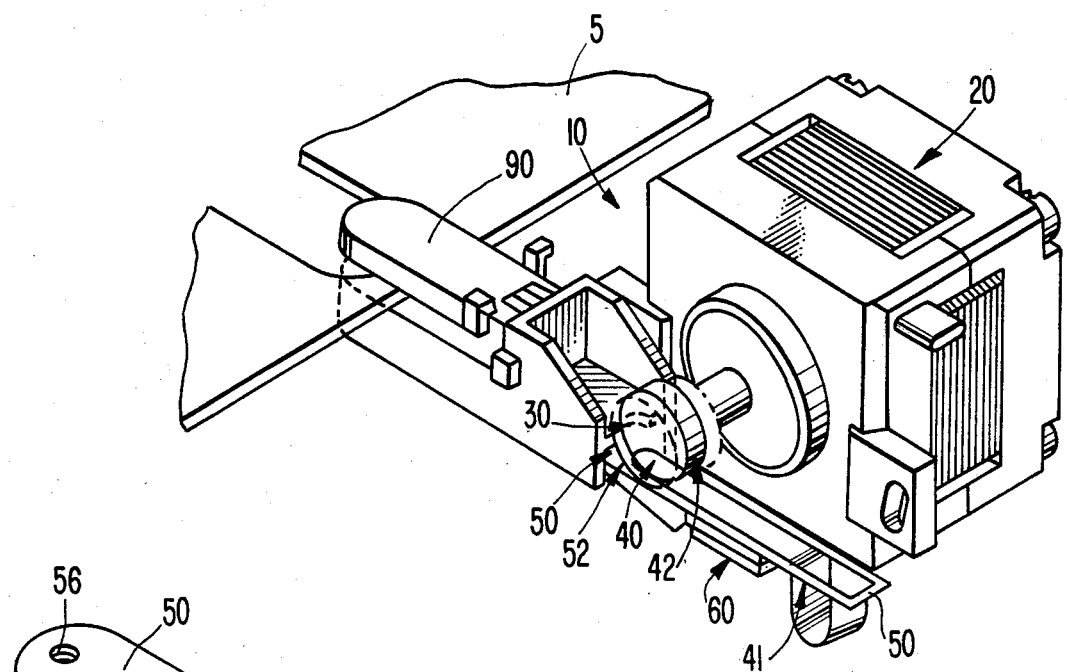
FIG. 3 shows an isometric view of the disk drive access mechanism with the damping member and with the head carriage in its outer most position as it would be after the mechanism was assembled into a disk drive and during operation.
Figure 6:
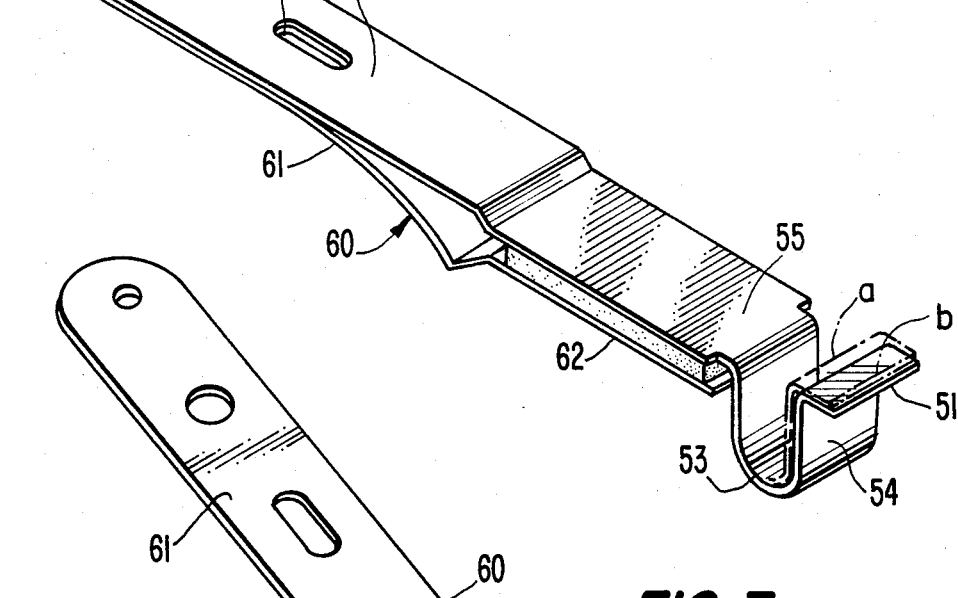
FIG. 6 shows an isometric view of the tensioner and damping member.

The low mass tensioner 50 as shown in FIG. 6 is a thin elongated member which includes a U-shaped portion 53 adjacent to the first end portion 51 of tensioner 50. This U-shaped portion 53 operates to tension the flexible band 40 about the pulley 30, as shown in FIGS. 1, 2 and 3. An intermediate portion 55 of tensioner 50 is located on the other side of the U-shaped portion 53 from the first end portion 51. The second end portion 52 is adjacent to the intermediate portion 55. As the first portion 41 of flexible band 40 is attached to the first end portion 51 of tensioner 50 and the second portion 42 of flexible band 40 is attached to the second end portion 52 of tensioner 50, an external force is applied to deflect the U-shaped portion 53 from its nominal position indicated as "b" in FIG. 6 to a position indicated as "a" in FIG. 6. The tension in the flexible band 40, FIG. 1, is produced by the U-shaped portion 53 when the external force is removed. Since the flexible band 40 is attached to opposite sides of this compressed U-shaped portion 53, the band 40 becomes tensioned under the force of the tensioner 50 to return to its original uncompressed position. This U-shaped portion 53 allows the flexible band 40 to be tensioned while still maintaining the low mass of the tensioner which is necessary for robotic handling of the mechanism without damage.

Figure 14:
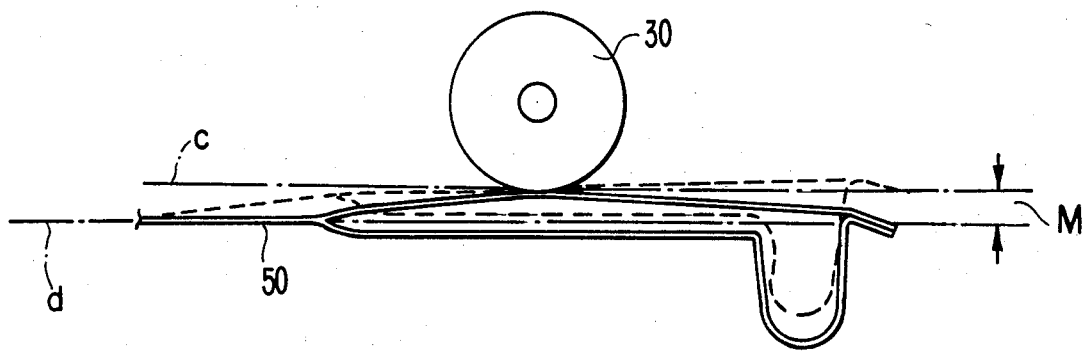
FIG. 14 shows a flexible tensioner.

It is important in this invention that in addition to utilizing a low mass tensioner enabling robotic handling for ease of assembly, the functional relationships of the parts are maintained for reliable and accurate operation. This reliability and accuracy is further accomplished by the flexibility of the tensioner. The flexibility, or compliance, of the tensioner is in a direction that is perpendicular to the axis of the pulley. When the tensioner 50 is attached to the carriage 90 and the stepper motor 20 is attached to frame 80 there is often a vertical mismatch between the tensioner 50 and the pulley 30 due to manufacturing tolerances. As shown in FIG. 14, this mismatch (m) occurs between the plane (d) defined by the tensioner 50 attachment points to carriage 90 and a parallel plane (c) tangent to the stepper motor pulley 30. The effect of this mismatch is to cause the band to leave the pulley at angles to the plane established by the tensioner. This causes the output motion of the tensioner to no longer be linear relative to the pulley rotation. The compliance in the tensioner allows the tensioner to deflect so that the tensioner and the plane (c) tangent to the pulley lie in the same approximate vertical plane as shown by the dotted lines in FIG. 14. This reduces the amount of force transmitted back through the carriage supports which in turn reduces the amount of friction induced hysteresis in the access mechanism. The vertical compliance in the tensioner also makes the plane of the band more nearly parallel to the plane of the carriage motion. Thus the output motion of the tensioner from the motor is linear, not arcuate.

Referring to FIG. 6, which is an enlarged detail of the tensioner 50 as shown in FIG. 1, the first end portion 51 and the second end portion 52 of the tensioner 50 lie in the same plane while the intermediate portion 55 of the tensioner 50 lies in a second plane parallel to the first plane but spaced from the first plane in a direction away from the pulley 30 and flexible band 40. This allows clearance for misalignment between the pulley and the tensioner in case manufacturing tolerances cause the tensioner to be too close to the pulley.

As shown in FIG. 4, the disk drive access mechanism 10 can be handled by a robotic hand 70 by gripping the ends of motor 20. The low mass of the tensioner 50 ensures that the flexible band 40 is not damaged as the motor 20 is handled by the robot, leaving the flexible band 40 and tensioner 50 unsupported and free to move. It is this low mass tensioner that makes the assembly capable of robotic handling. As the assembly is lifted, the tensioner is light enough in weight such that under the force of gravity the tensioner will not pull on the flexible band with enough force to distort, misalign, or break the flexible band, or cause the flexible band to move off center of the pulley. Therefore, the access mechanism can be grasped on the ends of the motor housing leaving the tensioner hanging in space subject to the forces of gravity without additional support, and without causing damage or misalignment to the flexible band. Because the low mass tensioner needs no other support means to prevent it from pulling on the flexible band with a force great enough to damage the flexible band, the disk drive head access mechanism is thus a self-supporting unitary assembly capable of robotic handing without damage.

Figure 5:
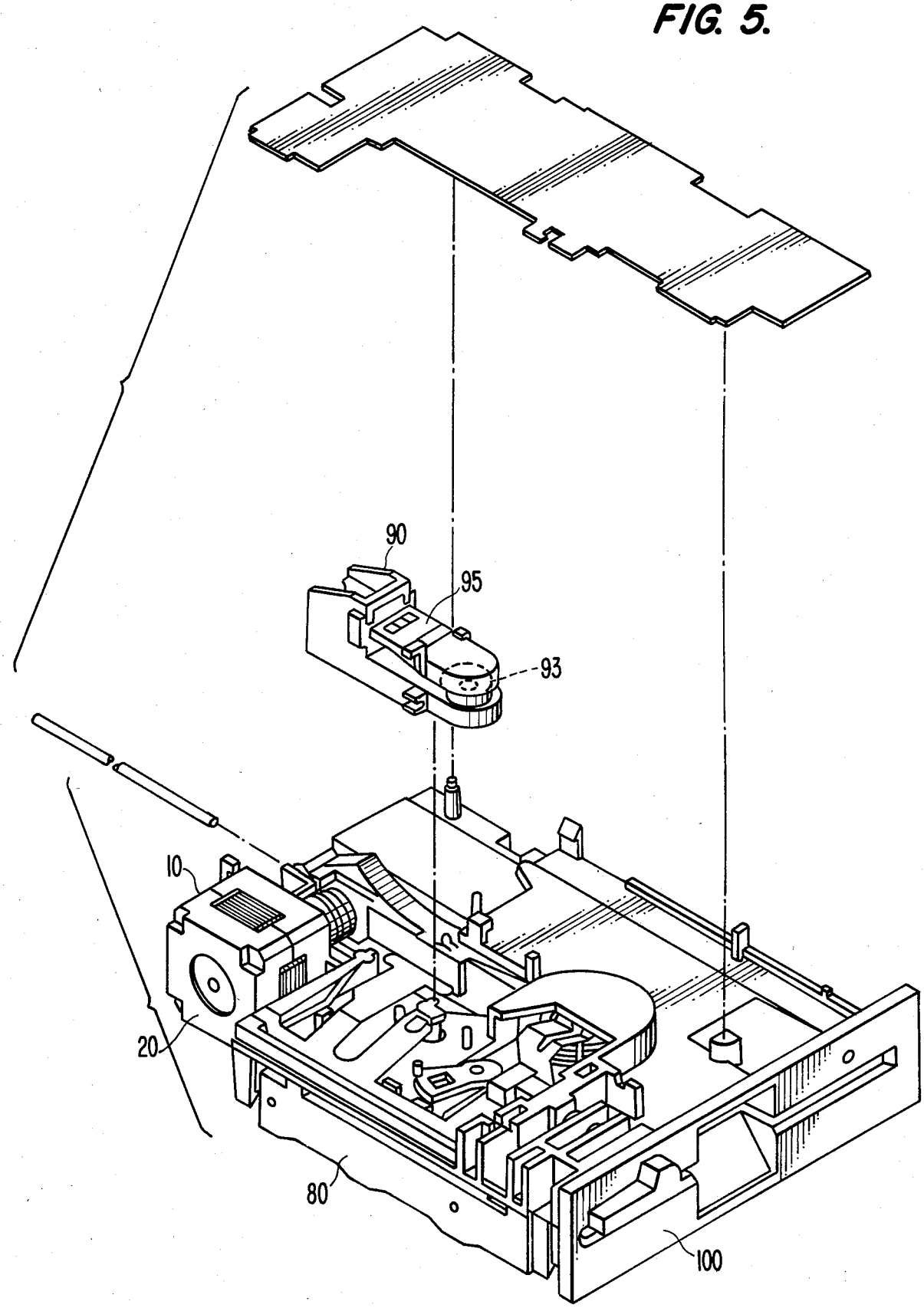
FIG. 5 is a perspective view of the top frame of a disk drive snapped to the lower frame and including an exploded view of the head carriage and logic card to be added during final assembly and after the head access mechanism is attached to the lower frame.

Thus, the disk drive access mechanism 10 is capable of being automatically mounted as a unit onto the frame member 80 of a disk drive 100 by mounting holes 22 on motor 20 as shown in FIGS. 4 and 5. Once the disk drive access mechanism 10 is mounted to the disk drive's main frame member 80 (FIG. 5), the head carriage assembly 90 (FIG. 5) can then be attached to the disk drive's main frame member 80 by sliding on guide rods 84 and 85 (FIG. 4). The tensioner 50 is then attached to carriage 90 (FIG. 5) through mounting hole 59 (FIG. 4). Hole 56 and slot 57 in tensioner 50 align tensioner 50 to carriage 90 through the action of pins (not shown) on carriage 90. This aligns the axis of motion of tensioner 50 to carriage 90.

As shown in FIGS. 2 and 3, disk drive head access mechanism 10 provides an accurate means of translating a head carriage assembly 90. Mechanism 10 indexes in equal spacings a head carriage assembly 90 which traverses the recording disk 5 along its radius. While accessing the outermost tracks, the tensioner becomes cantilevered to a maximum amount as shown in FIG. 3.

Taken together, FIG. 2 and 3 show the extreme positions of the head carriage 90 as it is moved linearly along the radius of a disk 5 to access a desired track.

In FIG. 2, the head access mechanism 10 is shown accessing the tracks farthest away from the mechanism. As a result, the first end portion 51 of the tensioner 50 is closest to the pulley 30. Consequently, the first portion 41 of flexible band 40 is wrapped around the pulley, while the second portion 42 of band 40 is extended along the tensioner 50.

FIG. 3 shows the head access mechanism 10 accessing the tracks closest to the mechanism. As a result, the second end portion 52 of the tensioner 50 is closest to the pulley 30. Consequently, second portion 42 of flexible band 40 is wrapped around the pulley, while the first portion 41 of band 40 is extended along the tensioner 50.

While the head carriage assembly 90 is at this track location, there is a greater probability that tensioner vibrations will cause read/write errors. The occurrence of these errors will depend on track location, access direction, vibration frequency, and mechanism tolerances. In a preferred embodiment, a damping member 60 is mounted to the tensioner 50 to damp the vibration of the tensioner when the mechanism is at the far end of its head access stroke. Read/write errors are minimized and reliable operation is achieved at expected operational vibration levels.

As shown in FIG. 6, the damping member 60 has a first end 61 securely attached to the bottom side of the second end portion 52 of the tensioner 50, and a second end 62 which extends toward the U-shaped portion 53 of the tensioner 50. The second end 62 is biased against, but is not attached to, the bottom side of the intermediate portion 55 of the tensioner 50. The mounting of the damping member will cause a bending movement in the damping member and deflection in the first end 61 in order to achieve a biasing force of the elastomer 63 against the tensioner. As a result, the vibrations of the band and tensioner will be damped.

Figure 7:
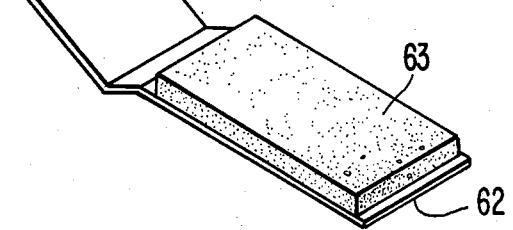
FIG. 7 shows an isometric view of the damping member.

As shown in FIGS. 6 and 7, the damping member 60 has a compressible elastomer 63 attached to the second end 62 to further damp the vibrations of the tensioner 50. The compressible elastomer compresses slightly under the loading force of the damping member bearing against the intermediate portion 55 of the tensioner 50.

In a preferred embodiment the damping member 60 is 0.254 mm thick with a 1.6 mm thick polyurethane or polyethylene open cellular foam attached at one end. This damping member can be installed as a separate part or welded to the access assembly eliminating the assembling of additional pieces.

Figure 11B:
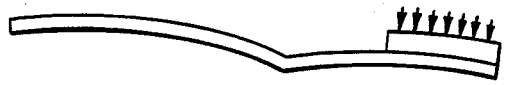
FIGS. 11a and 11b are schematic diagrams of the damping member.
Figure 11A:
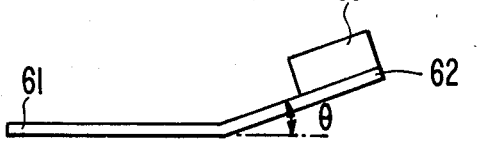

As shown in FIGS. 11a and 11b, the damping member is angled between the ends 61 and 62. The angle $\phi$ in the damping member controls the loading of the foam member 63 against the intermediate portion 55 of the tensioner 50.

In a preferred embodiment, the damping member and tensioner are both made of stainless steel, preferably 0.010 inches in thickness. The exact thickness may vary. However, a tensioner too thin may buckle and a tensioner too thick may be too rigid to work properly. The flexible band is also made of stainless steel approximately 0.002 inches thick, although other dimensions will also work. In addition, the utilization of other materials will also result in other acceptable dimensions.

Figure 8:
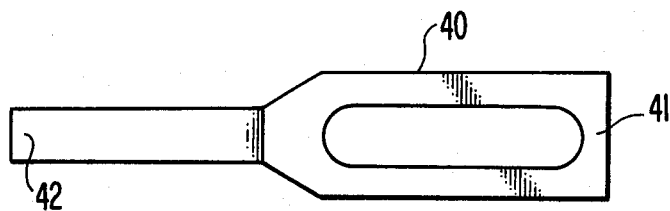
FIG. 8 shows a top plan view of a flexible band of the split band type.
Figure 9:
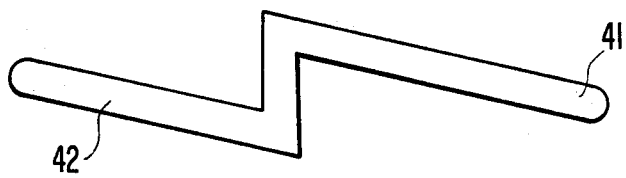
FIG. 9 shows a top plan view of a flexible band of the helix band type.

In a preferred embodiment the flexible band is of the split band type, as shown in FIG. 8, which requires second portion 42 of the flexible band 40 to be fed through the first portion 41 of the flexible band 40 as the two portions are wrapped around the pulley. It is possible to use a flexible band that is not of the split band type. A band of the helix band type, as shown in FIG. 9, can be wrapped around the pulley without having to be fed through itself. First portion 41 and second portion 42 would lie adjacent to each other on the surface of the pulley 30. Although the helix band makes assembly of the parts easier, the tensioner may have a tendency not to track straight relative to the face of the motor.

DESCRIPTION OF OPERATION

The head access mechanism of this invention is assembled outside of a disk drive by an automated process as described below. The access mechanism utilizes a minimum number of parts (3) and laser welding for ease of assembly in an automated fashion.

Figure 12:
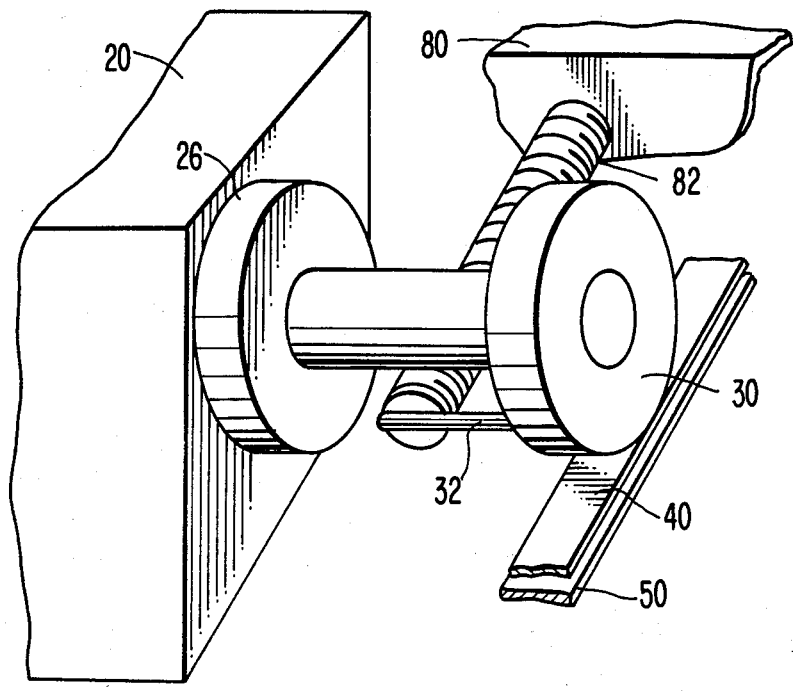
FIG. 12 shows an access mechanism with a zero stop pin.

Referring to FIG. 12, stepper motor 20 is located in a fixture using mounting pads 24 (FIG. 2) and annular periphery 26. These features also locate the stepper motor in the drive upon assembly. A zero stop pin 32 connected to pulley 30 is referenced against a reference surface on the fixture.

This zero stop pin is used as a stop for the access mechanism during operation in a disk drive. The access mechanism is driven until the zero stop pin 32 of pulley 30 hits a hard stop such as an adjustment screw 82 attached to the main drive frame, as illustrated in FIG. 12. For accurate operation, a fixed relationship is required between the zero stop pin 32 of pulley 30, and the band 40 and tensioner 50. This relationship is established in the fixture used for assembling the parts together by welding. The pulley is rotated in the fixture until the zero stop pin is against a reference surface. The tensioner and band are located by pins in the fixture as described below. Thus, the relationship between the parts is established.

The tensioner 50 (FIG. 6) is located in the fixture using pins that pass through hole 56 and slot 57. The hole and slot are the features that locate the tensioner relative to the carriage 90 (FIG. 5) in the drive. The pins are located in the fixture such that they duplicate the nominal locations in the drive. A feature in the fixture acts to deflect the rear leg 54 (FIG. 6) of the tensioner in the direction that compresses the 'U'.

Figure 13:
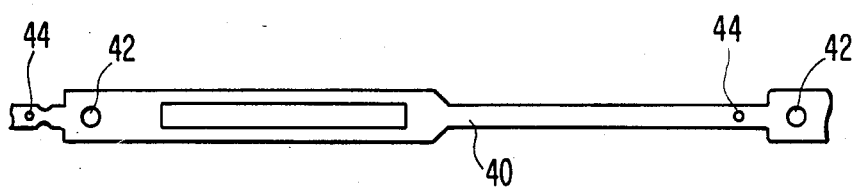
FIG. 13 is a top plan view of a continuous flexible band.

The band 40 is manufactured using a continuous stamping process to facilitate automated assembly. The band 40 (FIG. 13), which is in the form of a continuous strip, is wrapped on a reel. This reel is then loaded into the machine that assembles the access mechanism. The band is fed from the reel into guides that route the band over the tensioner, around the pulley, and then thread the split band through itself. The front of the band has a small hole 44 that is located by the same pin that locates slot 57 (FIG. 6) of the tensioner. The pin is stepped to accommodate the different hole sizes in the band and tensioner. The rear of the band is located and the band is tensioned by pulling on hole 42. Provisions are made to keep the band in contact with the tensioner at the front and rear.

The band is welded to the tensioner and pulley. A preferred method is to use laser welding although resistance welding would also work. The rear of the band is then trimmed flush with the end of the tensioner.

The fixturing of the parts prior to welding guarantees that the functional relationships between the tensioner, stepper motor, zero stop pin, and band are correct. This helps to ensure the accuracy of the access mechanism.

The completed access assembly is removed from the fixture. When the rear leg 54 is released from the fixture it is prevented from returning to its undeflected position by the band. This in turn puts tension in the band.

The assembled head access mechanism is assembled into a disk drive as described below. As shown in FIG. 4, a robotic hand 70 grasps the ends of the motor 20 of the head access mechanism 10 for mounting to the mainframe 80 of the disk drive.

FIG. 5 shows the head access mechanism 10 assembled to the disk drive 100 and ready for further assembly of the other parts.

A flexible disk drive 100 is shown in FIG. 10 and illustrates such a drive with the access mechanism 10 of this invention included therein. Flexible disk drive 100 is shown in FIG. 10 without the logic card (a printed circuit board with electronic components thereon) that is positioned on the top of the drive and provides the electrical interfacing for the device.

While drive 100, as particularly shown herein, is a half-height, five and one-fourth inch diskette drive, as is typically used in a personal computer, it is to be realized that the invention described herein may also be utilized in other disk drives.

As shown, flexible disk drive 100 includes a front panel 101 connected with top plate 102, with the front panel having an access slot 103 therein through which the disk cartridge, with the floppy disk therein, may be inserted.

As shown in FIGS. 4 and 5, the elements for reading and writing on a disk within the drive are mounted on lower frame 80. As shown, this includes the stepping motor 20, flexible band 40 and tensioner 50 (shown in FIG. 1) and carriage 90 having the recording arm 95 and recording head 93 thereon.

Head carriage 90 is mounted on main frame 80 so as to be constrained to forward and rearward movement with respect to the main frame, with such movement being controlled by stepping motor 20 through the flexible band 40 and tensioner 50, with motor 20 being also mounted on main frame 80. Stepping motor 20, in connection with flexible band 40 and tensioner 50, steps head carriage 90 along a radial line of a flexible disk to maintain the recording head 93 on head carriage 90 aligned with the desired track on the disk.

In operation, the assembly of each frame member is individually carried out, preferably by robotic arms, after which the frame members are snapped together during final assembly. After final assembly, the drive is ready for use by loading a disk cartridge into the drive and then using the disk within the cartridge for reading or writing magnetic signals thereon.

Although the foregoing invention has been particularly shown and described with reference to the preferred embodiments thereof, it will be understood by those skilled in the art that other changes in form may be made without departing from the spirit and scope of the invention.

We claim:

1. A unitary disk drive head access mechanism mountable on a disk drive frame comprising:
   a rotary output motor having a shaft;
   a cylindrical pulley mounted to the shaft of said motor;
   a flexible band wrapping around said cylindrical pulley and having a mid portion securely attached to said cylindrical pulley, and having a first and second portion leaving contact with the surface of the cylindrical pulley in opposite directions;
   an elongated low mass tensioner having a first end portion securely attached to said first portion of said flexible band, a second end portion securely attached to said second portion of said flexible band, and an intermediate portion between said first and second end portions, said tensioner engaging said flexible band to cause the disk drive head access mechanism to be self supporting, said tensioner and said flexible band effectuated to move linearly by rotation of said shaft of said motor;
   means for effectuating a force between said first and second end portions of said tensioner thereby tensioning said flexible band; and
   means for attaching said second end portion of said tensioner to said head carriage.

2. A disk drive head access mechanism as in claim 1 wherein the means for effectuating a force between said first and second end portions of said tensioner thereby tensioning said flexible band comprises a U-shaped portion juxtaposed between the first end portion and the intermediate portion;
   said U-shaped portion of said elongated low mass tensioner compressed by said attachment of said tensioner to said first and second ends of said flexible band thereby tensioning said flexible band about said pulley.

3. A disk drive head access mechanism as in claim 1 or 2 wherein the rotary output motor is a reversible stepping motor.

4. A disk drive head access mechanism as in claim 1 or 2 wherein the flexible band is of the helix band type.

5. A disk drive head access mechanism as in claim 1 or 2 wherein the flexible band is of the split band type.

6. A unitary disk drive head access mechanism mountable on a disk drive frame comprising:
   a rotary output motor having a shaft;
   a cylindrical pulley mounted to the shaft of said motor;
   a flexible band wrapping around said cylindrical pulley and having a mid portion securely attached to said cylindrical pulley, and having a first and second portion leaving contact with the surface of the cylindrical pulley in opposite directions;
   an elongated low mass tensioner having a first end portion securely attached to said first portion of said flexible band, a second end portion securely attached to said second portion of said flexible band, and an intermediate portion between said first and second end portions, said tensioner engaging said flexible band to cause the disk drive head access mechanism to be self supporting, said tensioner and said flexible band effectuated to move linearly by rotation of said shaft of said motor;
   means for effectuating a force between said first and second end portions of said tensioner thereby tensioning said flexible band;
   means for attaching said second end portion of said tensioner to said head carriage; and
   a damping member having a first end securely attached to the bottom side of said second end portion of said tensioner, and having a second end which is biased against, but is not attached to, the bottom side of said intermediate portion of said tensioner, thereby damping vibrations of said band and tensioner;

7. A disk drive head access mechanism as in claim 6 wherein the means for effectuating a force between said first and second end portions of said tensioner thereby tensioning said flexible band comprises a U-shaped portion juxtaposed between the first end portion and the intermediate portion;
   said U-shaped portion of said elongated low mass tensioner compressed by said attachment of said tensioner to said first and second ends of said flexible band thereby tensioning said flexible band about said pulley.

8. A disk drive head access mechanism as in claim 6 or 7 wherein the damping member has a compressible elastomer mounted on the second end of said damping member which bears against the intermediate portion of the tensioner.

9. A disk drive head access mechanism as in claim 6 or 7 wherein the damping member has a compressible elastomer mounted on the second end of said damping member which bears against the intermediate portion of the tensioner wherein the compressible elastomer is open cellular polyethylene foam.

10. A disk drive head access mechanism as in claim 6 or 7 wherein the damping member has a compressible elastomer mounted on the second end of said damping member which bears against the intermediate portion of the tensioner wherein the compressible elastomer is open cellular polyurethane foam.

11. A disk drive head access mechanism as in claim 6 or 7 wherein the rotary output motor is a stepping motor.

12. A disk drive head access mechanism as in claim 6 or 7 wherein the damping member and tensioner are stainless steel.

13. A disk drive head access mechanism as in claim 6 or 7 wherein the flexible band is of the helix band type.

14. A disk drive head access mechanism as in claim 6 or 7 wherein the flexible band is of the split band type.

* * * * *